US012627069B2

(12) United States Patent
Zhao et al.

(10) Patent No.: US 12,627,069 B2

(45) Date of Patent: May 12, 2026

(54) LIQUID CRYSTAL ANTENNA AND METHOD FOR MANUFACTURING THE SAME, AND ANTENNA ARRAY

(71) Applicants: Beijing BOE Sensor Technology Co., Ltd., Beijing (CN); BOE TECHNOLOGY GROUP CO., LTD., Beijing (CN)

(72) Inventors: Wei Zhao, Beijing (CN); Xiaoqiang Yang, Beijing (CN); Yiming Wang, Beijing (CN); Lu Chen, Beijing (CN); Mengjiao Li, Beijing (CN); Zhifeng Zhang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 39 days.

(21) Appl. No.: 18/639,976

(22) Filed: Apr. 19, 2024

(65) Prior Publication Data

US 2024/0332817 A1 Oct. 3, 2024

Related U.S. Application Data

(63) Continuation of application No. PCT/CN2023/084094, filed on Mar. 27, 2023.

(51) Int. Cl.

*H01Q 21/00* (2006.01)

*H01Q 21/06* (2006.01)

(52) U.S. Cl.

CPC ....... *H01Q 21/0087* (2013.01); *H01Q 21/061* (2013.01)

(58) Field of Classification Search

CPC ............. H01Q 21/0087; H01Q 21/061; H01Q 21/0025; H01Q 3/44; H01Q 1/2283

See application file for complete search history.

(56) References Cited

U.S. PATENT DOCUMENTS

| | | | | |
|---|---|---|---|---|
| 2020/0381810 A1* | 12/2020 | Sun | .......................... | H01Q 3/46 |
| 2021/0242579 A1 | 8/2021 | Tsai | | |

FOREIGN PATENT DOCUMENTS

| | | |
|---|---|---|
| CN | 104820519 A | 8/2015 |
| CN | 108803165 A | 11/2018 |

(Continued)

OTHER PUBLICATIONS

International Search Report and Written Opinion for International Application No. PCT/CN2023/084094 issued by the International Searching Authority on Dec. 25, 2023.

(Continued)

*Primary Examiner* — Jason M Crawford

*Assistant Examiner* — Jose A. Miranda Gonzalez

(74) *Attorney, Agent, or Firm* — XSENSUS LLP

(57) ABSTRACT

A liquid crystal antenna is provided. The liquid crystal antenna includes a liquid crystal layer, a first substrate, a second substrate, a first connection portion and a second connection portion. The first substrate and the second substrate are located on both sides of the liquid crystal layer in a first direction. The first substrate includes a plurality of first control lines, and the second substrate includes a plurality of second control lines. The first connection portion and the second connection portion are located on the same side edge of the liquid crystal antenna and are staggered in the first direction. The first connection portion is electrically connected to the plurality of first control lines, and the second connection portion is electrically connected to the plurality of second control lines.

20 Claims, 13 Drawing Sheets

(56) References Cited

FOREIGN PATENT DOCUMENTS

| | | | |
|---|---|---|---|
| CN | 109116643 | A | 1/2019 |
| CN | 113140162 | A | 7/2021 |
| CN | 113260148 | A | 8/2021 |
| CN | 113488771 | A | 10/2021 |
| CN | 113900310 | A | 1/2022 |
| CN | 114284714 | A | 4/2022 |
| CN | 115051156 | A | 9/2022 |
| CN | 115421326 | A | 12/2022 |

OTHER PUBLICATIONS

The First Office Action mailed Dec. 20, 2025, in Chinese Application No. 202380008444.7, 18 pages including English translation.

* cited by examiner

LIQUID CRYSTAL ANTENNA AND METHOD FOR MANUFACTURING THE SAME, AND ANTENNA ARRAY

CROSS-REFERENCE TO RELATED APPLICATION

This application is a bypass continuation application of International Patent Application No. PCT/CN2023/084094, filed on Mar. 27, 2023, which is incorporated herein by reference in its entirety.

TECHNICAL FIELD

The present disclosure relates to the field of antenna technologies, and in particular, to a liquid crystal antenna and method for manufacturing the same, and antenna array.

BACKGROUND

The liquid crystal antenna includes a first substrate, a second substrate, a circuit board, and a liquid crystal phase shifter located between the first substrate and the second substrate. Since the first substrate and the second substrate may be staggered from each other to form a step portion, a portion of the circuit board is bonded to the step portion, and another portion of the circuit board is located outside the step portion. After a plurality of liquid crystal antennas are tiled into an antenna array, in the antenna array, since other portions of circuit boards are located outside the step portion, there is a gap between adjacent liquid crystal antennas at the step portion, and the gap has a great impact on the scanning angle of the array antenna. Therefore, an antenna array into which a plurality of liquid crystal antennas are tiled without gaps has good development prospects.

SUMMARY

In an aspect, a liquid crystal antenna is provided. The liquid crystal antenna includes a liquid crystal layer, a first substrate, a second substrate, a first connection portion and a second connection portion. The first substrate and the second substrate are located on two sides of the liquid crystal layer in a first direction. The first substrate includes a plurality of first control lines, and the second substrate includes a plurality of second control lines. The first connection portion and the second connection portion are located on a same side edge of the liquid crystal antenna and staggered in the first direction. The first connection portion is electrically connected to the plurality of first control lines, and the second connection portion is electrically connected to the plurality of second control lines.

In some embodiments, the first connection portion is located on the first substrate, and the second substrate has a second notch exposing the first connection portion. The second connection portion is located on the second substrate, and the first substrate has a first notch exposing the second connection portion.

In some embodiments, the first substrate includes a first main body portion and a first extension portion. The first main body portion has a first edge, and the first extension portion is connected to at least part of the first edge. The second substrate includes a second main body portion and a second extension portion. The second main body portion has a second edge, and the second extension portion is connected to at least part of the second edge. In the first direction, the first edge overlaps with the second edge, and at least part of the first extension portion and at least part of the second extension portion are staggered. The first connection portion is located in a staggered area of the first extension portion, and the second connection portion is located in a staggered area of the second extension portion.

In some embodiments, the first extension portion has a third notch, and the first connection portion is disposed proximate to the third notch. The second extension portion has a fourth notch, and the second connection portion is disposed proximate to the fourth notch. In the first direction, the third notch and the fourth notch are staggered.

In some embodiments, the first extension portion includes a third edge, a first corner edge and a second corner edge. The third edge is opposite to the first edge, the first corner edge at least connects an end of the third edge to the first edge, and the second corner edge connects another end of the third edge to the first edge. The first connection portion is disposed proximate to the second corner edge. The second extension portion includes a fourth edge, a third corner edge and a fourth corner edge. The fourth edge is opposite to the second edge, the third corner edge at least connects an end of the fourth edge to the second edge, and the fourth corner edge connects another end of the fourth edge to the second edge. The second connection portion is disposed proximate to the fourth corner edge. In an extending direction of the first edge, the second corner edge, the third corner edge, the first corner edge, and the fourth corner edge are arranged in sequence.

In some embodiments, an included angle between the second corner edge and the first edge is less than or equal to 20°, and an included angle between the fourth corner edge and the second edge is less than or equal to 20°.

In some embodiments, in the first direction, the third edge overlaps with the fourth edge.

In some embodiments, the first connection portion and the second connection portion are both located on the first substrate. The first substrate further includes a plurality of third control lines. The liquid crystal antenna further includes a plurality of transfer portions located between the first substrate and the second substrate. The plurality of second control lines are connected to the plurality of third control lines in one-to-one correspondence by the plurality of transfer portions, and the second connection portion is electrically connected to the plurality of second control lines by the plurality of third control lines and the transfer portions.

In some embodiments, the first substrate includes a first main body portion and a first extension portion. The first main body portion has a first edge, and the first extension portion is connected to at least part of the first edge. The first connection portion and the second connection portion are located on the first extension portion. In the first direction, the second substrate overlaps with the first main body portion.

In some embodiments, the first substrate includes a first connection edge, a second connection edge and a fifth corner edge, and the fifth corner edge connects the first connection edge to the second connection edge. A virtual extension line of the first connection edge, a virtual extension line of the second connection edge and the fifth corner edge surround a fifth notch. The second substrate includes a third connection edge, a fourth connection edge and a sixth corner edge, and the sixth corner edge connects the third connection edge to the fourth connection edge. A virtual extension line of the third connection edge, a virtual extension line of the fourth connection edge and the sixth corner edge surround a sixth notch. The first connection portion and the second connection portion are disposed proximate to the fifth corner edge, and the sixth notch exposes the first connection portion and the second connection portion.

In some embodiments, the second connection portion and the first connection portion are disposed integrally.

In some embodiments, the liquid crystal antenna further includes a frame sealant, and the frame sealant bonds the first substrate to the second substrate. The plurality of transfer portions are disposed in the frame sealant.

In some embodiments, the liquid crystal antenna further includes a first flexible circuit board and a second flexible circuit board. The first flexible circuit board is bonded to the first connection portion, and the second flexible circuit board is bonded to the second connection portion.

In some embodiments, the first substrate further includes a first electrode plate, and the plurality of first control lines are electrically connected to the first electrode plate. The second substrate further includes a second electrode plate, and the plurality of second control lines are electrically connected to the second electrode plate.

In another aspect, a method for manufacturing a liquid crystal antenna is provided. The method includes: forming a first substrate and a second substrate; forming a liquid crystal layer between the first substrate and the second substrate, the first substrate including a plurality of first control lines, and the second substrate including a plurality of second control lines; and forming a first connection portion and a second connection portion on a same side edge of the liquid crystal antenna, the first connection portion and the second connection portion being staggered in a first direction, the first connection portion being electrically connected to the plurality of first control lines, and the second connection portion being electrically connected to the plurality of second control lines.

In yet another aspect, an antenna array is provided. The antenna array includes a plurality of above liquid crystal antennas tiled together.

In some embodiments, the plurality of liquid crystal antennas are arranged into at least two rows of liquid crystal antennas in a second direction, and the second direction intersects the first direction.

In some embodiments, in two adjacent rows of liquid crystal antennas, side edges of a row of liquid crystal antennas not provided with the first connection portion and the second connection portion are adjacent to side edges of another row of liquid crystal antennas not provided with the first connection portion and the second connection portion in the second direction.

In some embodiments, the first connection portion is located on the first substrate. The first substrate has a first notch exposing the second connection portion, and includes a first main body portion and a first extension portion. The first extension portion has a third notch, and the first connection portion is disposed proximate to the third notch. The second connection portion is located on the second substrate. The second substrate has a second notch exposing the first connection portion, and includes a second main body portion and a second extension portion. The second extension portion has a fourth notch, and the second connection portion is disposed proximate to the fourth notch. The plurality of liquid crystal antennas are arranged into at least three rows of liquid crystal antennas in a second direction, and the second direction intersects the first direction.

In some embodiments, the first connection portion and the second connection portion are both located on the first substrate. The first substrate further includes a plurality of third control lines. The liquid crystal antenna further includes a plurality of transfer portions located between the first substrate and the second substrate. The plurality of second control lines are connected to the plurality of third control lines in one-to-one correspondence by the plurality of transfer portions, and the second connection portion is electrically connected to the plurality of second control lines by the plurality of third control lines and the transfer portions. The first substrate includes a first connection edge, a second connection edge and a fifth corner edge, and the fifth corner edge connects the first connection edge to the second connection edge. A virtual extension line of the first connection edge, a virtual extension line of the second connection edge and the fifth corner edge surround a fifth notch. The second substrate includes a third connection edge, a fourth connection edge and a sixth corner edge, and the sixth corner edge connects the third connection edge to the fourth connection edge. A virtual extension line of the third connection edge, a virtual extension line of the fourth connection edge and the sixth corner edge surround a sixth notch. The first connection portion and the second connection portion are disposed proximate to the fifth corner edge, and the sixth notch exposes the first connection portion and the second connection portion. The plurality of liquid crystal antennas are arranged into at least three rows of liquid crystal antennas in a second direction, and the second direction intersects the first direction.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
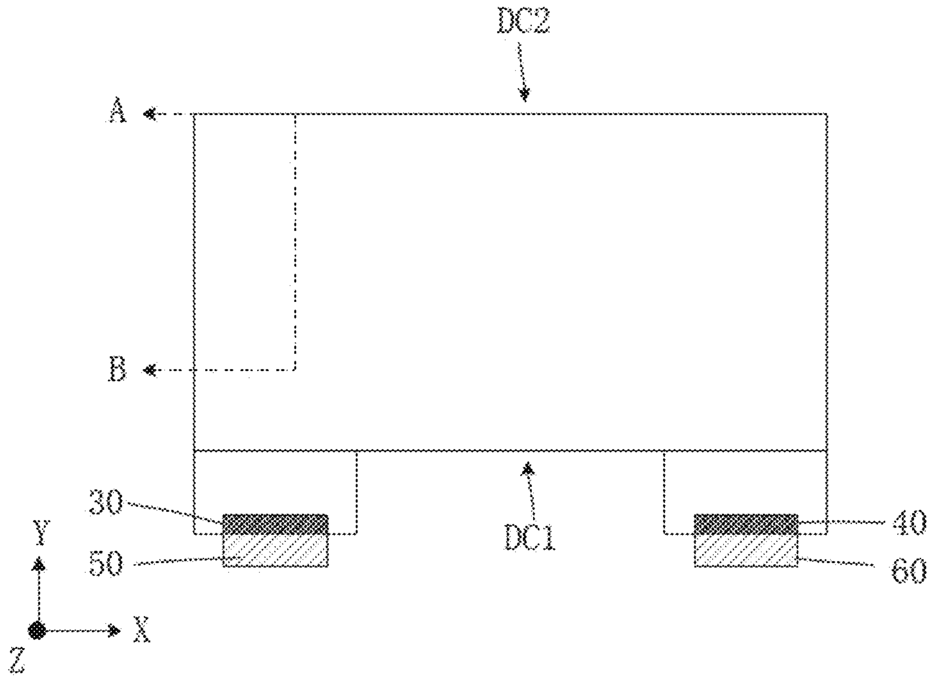
FIG. 1 is a structural diagram of a liquid crystal antenna, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. The term "connection" should be understood in a broad sense. For example, the "connection" may be a fixed connection, a detachable connection, or of an integrated structure; and it may be a direct connection or an indirect connection by an intermediate medium. The term "coupled" indicates, for example, that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude apparatuses that are applicable to or configured to perform additional tasks or steps.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Some embodiments of the present disclosure provide a liquid crystal antenna. The liquid crystal antenna may be widely applied to a low orbit satellite receiving antenna, a vehicle antenna, a base station antenna and other fields. Referring to FIGS. 1 to 4, the liquid crystal antenna includes a liquid crystal layer 80, and a first substrate 10 and a second substrate 20 provided oppositely in a first direction Z. The liquid crystal layer 80 is located between the first substrate 10 and the second substrate 20. Liquid crystal molecules in the liquid crystal layer 80 are anisotropic and exhibit different dielectric constants in a long axis direction and a short axis direction. In some examples, the liquid crystal antenna further includes a frame sealant 70, and the frame sealant 70 bonds the first substrate 10 to the second substrate 20. The liquid crystal layer 80 may be located in the frame sealant 70. In some examples, the liquid crystal antenna further includes a first alignment film PX1 and a second alignment film PX2. The first alignment film PX1 is disposed on a surface of the first substrate 10 proximate to the second substrate 20, and the second alignment film PX2 is disposed on a surface of the second substrate 20 proximate to the first substrate 10. The first alignment film PX1 and the second alignment film PX2 are used to set initial orientations of the liquid crystal molecules in the liquid crystal layer 80 without a bias electric field. The materials of the first alignment film PX1 and the second alignment film PX2 are, for example, polyimide.

The first substrate 10 may include a first base 11 and a plurality of first control lines 12. The plurality of first control lines 12 are arranged on a surface of the first base 11 proximate to the second substrate 20. The second substrate 20 may include a second base 21 and a plurality of second control lines 22. The plurality of second control lines 22 are arranged on a surface of the second base 21 proximate to the first substrate 10. Both the first base 11 and the second base 21 are glass substrates. The first substrate 10 (or the first base 11) and the second substrate 20 (or the second base 21) may each be in a range of a rectangle, a square, a pentagon, or the like. Hereinafter, description is made by considering an example where the first substrate 10 and the second substrate 20 are each in a shape of a rectangle.

In some examples, the first substrate 10 further includes a plurality of first electrode plates 13. The plurality of first electrode plates 13 are disposed on the surface of the first base 11 proximate to the second base 21. The first control lines 12 are electrically connected to the first electrode plate 13. The second substrate 20 further includes a plurality of second electrode plates 23. The plurality of second electrode plates 23 are disposed on the surface of the second base 21 proximate to the first base 11. The second control lines 22 are electrically connected to the second electrode plate 23. The material of the first electrode plate 13 may be a metal material, such as at least one of copper (Cu), aluminum (Al) and molybdenum (Mo). For the material of the second electrode plate 23, reference may be made to the relevant description of the material of the first electrode plate 13. The material of the first control line 12 may be a metal oxide such as indium tin oxide (ITO). For the material of the second control line 22, reference may be made to the relevant description of the material of the first control line 12.

The liquid crystal antenna further includes a first connection portion 30 and a second connection portion 40. The first connection portion 30 is electrically connected to the plurality of first control lines 12, and the second connection portion 40 is electrically connected to the plurality of second control lines 22. In this way, the modulation voltage applied to the first connection portion 30 may be transmitted to the first electrode plate 13 by the first control line 12, and the modulation voltage applied to the second connection portion 40 may be transmitted to the second electrode plate 23 by the second control line 22. Thus, a bias electric field may be generated between the first electrode plate 13 and the second electrode plate 23.

In some examples, the liquid crystal antenna further includes a first flexible circuit board 50 and a second flexible circuit board 60. The first flexible circuit board 50 is bonded to the first connection portion 30, and the second flexible circuit board 60 is bonded to the second connection portion 40. In this way, the first flexible circuit board 50 is used to apply the modulation voltage to the first connection portion 30, and the second flexible circuit board 60 is used to apply the modulation voltage to the second connection portion 40. Therefore, the first flexible circuit board 50 is used to control the modulation voltage on the first electrode plate 13, and the second flexible circuit board 60 is used to control the modulation voltage on the second electrode plate 23; and thus the first flexible circuit board 50 and the second flexible circuit board 60 may be used to adjust the electric field intensity of the bias electric field.

Then, when the liquid crystal molecules in the liquid crystal layer 80 are located in the bias electric field, the liquid crystal molecules will deflect, and then the dielectric constant of the liquid crystal layer 80 changes with the deflection of the liquid crystal molecules. In the liquid crystal antenna, for example, an electromagnetic wave signal (e.g., the electromagnetic wave signal may be an electromagnetic wave signal generated by an electromagnetic wave device, and the electromagnetic wave device may be a receiver or transmitter) is transmitted by a transmission line (e.g., the transmission line may be provided on the first substrate 10 or the second substrate 20), and the electromagnetic wave signal is transmitted in the liquid crystal layer 80 with a changed dielectric constant, so as to cause the phase of the electromagnetic wave signal to shift. Therefore, the modulation voltages applied to the first electrode plate 13 and the second electrode plate 23 may be controlled to change the electric field intensity of the bias electric field, thereby changing the deflection of the liquid crystal molecules in the liquid crystal layer 80. As a result, the phase of the electromagnetic wave signal is shifted.

Figure 5:
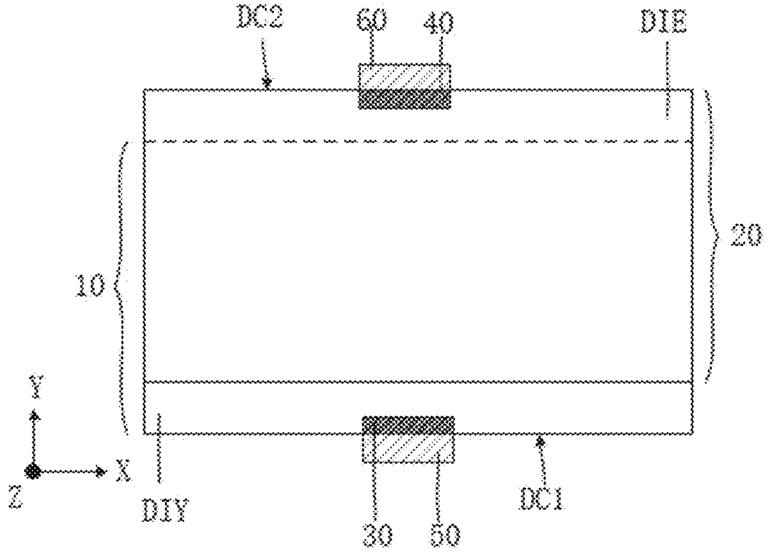
FIG. 5 is a structural diagram of a liquid crystal antenna in the related art.
Figure 6:
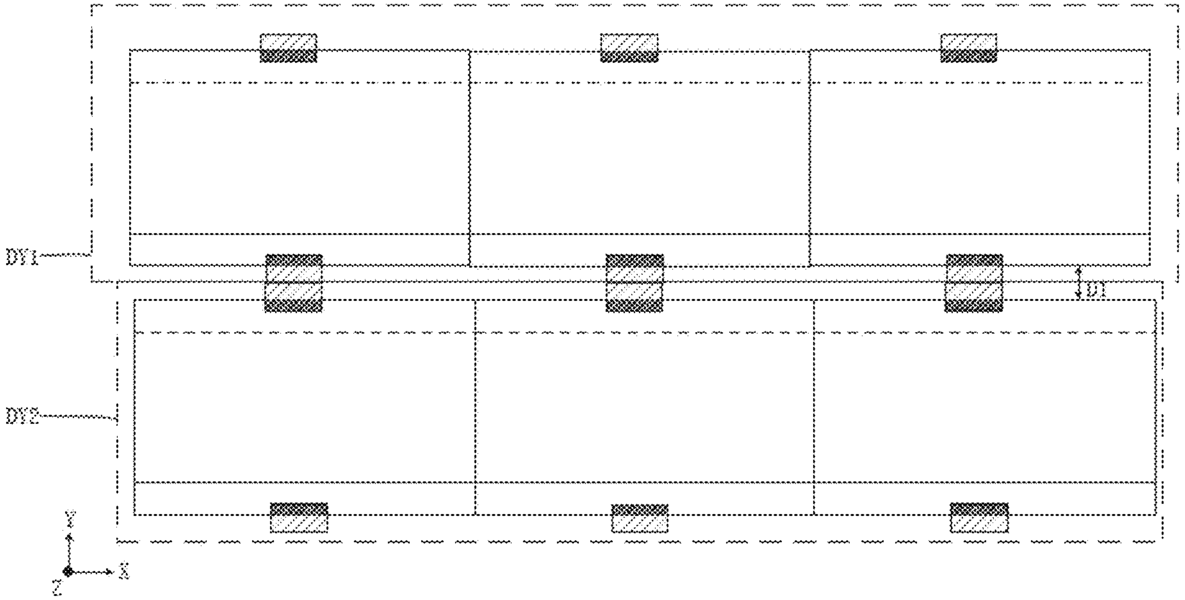
FIG. 6 is a structural diagram of an antenna array formed by a plurality of liquid crystal antennas in FIG. 5.
Figure 7:
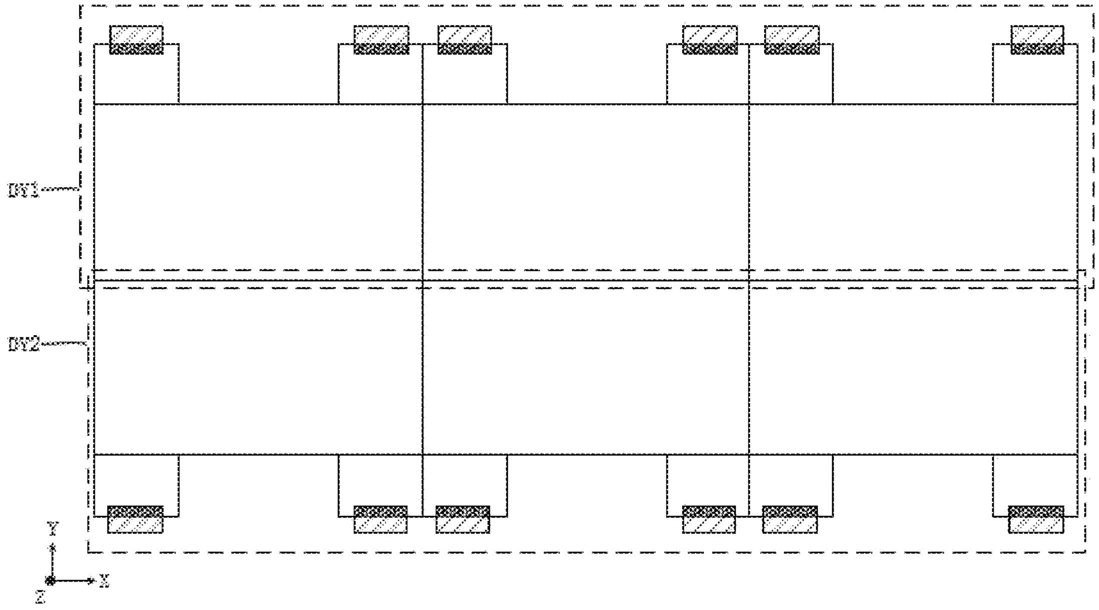
FIG. 7 is a structural diagram of an antenna array formed by a plurality of liquid crystal antennas in FIG. 1.

In the related art, referring to FIG. 5, the first substrate 10 and the second substrate 20 are staggered from each other in the second direction Y to form a step portion. For example, the liquid crystal antenna has a first side edge DC1 and a second side edge DC2 that are opposite, then the first substrate 10 may form a first step portion DIY at the first side edge DC1, and correspondingly, the second substrate 20 may form a second step portion DIE at the second side edge DC2. The first connection portion 30 is located on the first step portion DIY, and the second connection portion 40 is located on the second step portion DIE, so that a part of the first flexible circuit board 50 may be bonded to the first connection portion 30 on the first step portion DIY, and a part of the second flexible circuit board 60 may be bonded to the second connection portion 40 on the second step portion DIE. In this way, referring to FIGS. 5 and 6, in the third direction X, a plurality of liquid crystal antennas are tiled into a plurality of rows of liquid crystal antennas. There is no gap between adjacent liquid crystal antennas in each row of liquid crystal antennas. For example, there is no gap between three liquid crystal antennas in the first row of liquid crystal antennas DY1 shown in FIG. 6. However, when the plurality of rows of liquid crystal antennas (e.g., the first row of liquid crystal antennas DY1 and the second row of liquid crystal antennas DY2) are tiled in the second direction Y, since each liquid crystal antenna has step portions (i.e., the first step portion DIY and the second step portion DIE), so that there is a gap D1 between the first row of liquid crystal antennas DY1 and the second row of liquid crystal antennas DY2. The gap D1 may increase the scanning angle of the liquid crystal antenna and reduce side lobes of the liquid crystal antenna. The second direction Y intersects (e.g., perpendicular to) an extending direction (denoted as the third direction X) of the first side edge DC1, the first direction Z intersects (e.g., perpendicular to) the second direction Y, and the first direction Z intersects (e.g., perpendicular to) the third direction X.

In the embodiments of the present disclosure, with continued reference to FIGS. 1 to 4 and 7, the first connection portion 30 and the second connection portion 40 are located on the same side edge (which may be denoted as the first side edge DC1) of the liquid crystal antenna. Then, the plurality of rows of liquid crystal antennas (e.g., the first row of liquid crystal antennas DY1 and the second row of liquid crystal antennas DY2) are tiled, since the second side edges DC2 of the liquid crystal antennas have no step portions, connection portions and flexible circuit boards, the second side edges DC2 of the first row of liquid crystal antennas DY1 and the second side edges DC2 of the second row of liquid crystal antennas DY2 may be tiled. In this case, the first side edges DC1 of the first row of liquid crystal antennas DY1 and the first side edges DC1 of the second row of liquid crystal antennas DY2 face away from each other. In this way, the first row of liquid crystal antennas DY1 and the second row of liquid crystal antennas DY2 are tiled into an antenna array. In the antenna array, there is no gap between the second side edges DC2 of the first row of liquid crystal antennas DY1 and the second side edges DC2 of the second row of liquid crystal antennas DY2. Therefore, in the second direction Y, a plurality of liquid crystal antennas may be tiled into an antenna array with at least two rows of liquid crystal antennas, and there is no gap between two rows of liquid crystal antennas (e.g., the first row of liquid crystal antennas DY1 and the second row of liquid crystal antennas DY2), so that the liquid crystal antennas in the antenna array may reduce the scanning angle and improve the side lobes.

The first side edges DC1 of the first row of liquid crystal antennas DY1 and the second side edges DC2 of the first row of liquid crystal antennas DY1 may be understood as that in the first row of liquid crystal antennas DY1, the first side edges DC1 of all the liquid crystal antennas are located on the same side, and the second side edges DC2 of all the liquid crystal antennas are located on another same side. For understanding of the first side edges DC1 of the second row of liquid crystal antennas DY2 and the second side edges DC2 of the second row of liquid crystal antennas DY2, reference may be made to relevant explanation of the first side edges DC1 of the first row of liquid crystal antennas DY1 and the second side edges DC2 of the first row of liquid crystal antennas DY1. In addition, in the antenna array, the liquid crystal antennas in each row of liquid crystal antennas (e.g., the first row of liquid crystal antennas DY1 and the second row of liquid crystal antennas DY2) may have different arrangements. For example, in each row of liquid crystal antennas, first side edges DC1 and second side edges DC2 of adjacent liquid crystal antennas are opposite. As another example, in each row of liquid crystal antennas, in the first direction Z, the first substrate 10 and the second substrate 20 of adjacent liquid crystal antennas are opposite.

In the first direction Z, the first connection portion 30 and the second connection portion 40 are staggered; that is, an orthographic projection of the first connection portion 30 on a plane where the second substrate 20 is located and an orthogonal projection of the second connection portion 40 on the plane where the second substrate 20 is located do not overlap. In this way, the second connection portion 40 does not affect the bonding between the plurality of first control lines 12 and the first connection portion 30, and the first connection portion 30 does not affect the bonding between the plurality of second control lines 22 and the second connection portion 40.

For ease of description, two examples of the liquid crystal antennas are given below.

Example 1

With continued reference to FIGS. 1 to 4, the first connection portion 30 is located on the first substrate 10, the second substrate 20 has a second notch 26, and the second notch 26 exposes the first connection portion 30. That is, the orthographic projection of the first connection portion 30 on the second substrate 20 is located within the second notch 26. In this way, in a case where the first substrate 10 and the second substrate 20 have a small distance therebetween, the plurality of first control lines 12 may be soldered or bonded to the first connection portion 30 at the second notch 26. The second connection portion 40 is located on the second substrate 20, the first substrate 10 has a first notch 16, and the first notch 16 exposes the second connection portion 40. That is, the orthographic projection of the second connection portion 40 on the first substrate 10 is located within the first notch 16. In this way, in a case where the first substrate 10 and the second substrate 20 have a small distance therebetween, the plurality of second control lines 22 may be soldered or bonded to the second connection portion 40 at the first notch 16.

The first substrate 10 has a first main body portion 14 and a first extension portion 15. The first main body portion 14 has a first edge 141. The second substrate 20 has a second main body portion 24 and a second extension portion 25. The second main body portion 24 has a second edge 241. In the first direction Z, the first edge 141 and the second edge 241 have an overlap. That is, the extending direction of the first edge 141 is parallel to the extending direction of the second edge 241, and in the third direction X, a dimension of the first edge 141 is equal to a dimension of the second edge 241. Thus, in the first direction Z, the first edge 141 of the first main body portion 14 is flush with the second edge 241 of the second main body portion 24. The extending direction of the first side edge DC1 (i.e., the third direction X) is parallel to the extending direction of the first edge 141. In this way, in the first direction Z, the first main body portion 14 and the second main body portion 24 have an overlap, and then an overlapping area of the first substrate 10 and the second substrate 20 may be an overlapping area of the first main body portion 14 and the second main body portion 24, so that the liquid crystal layer 80 may be provided in the overlapping area.

In a possible implementation, in the second direction Y, a dimension of the first extension portion 15 is in a range of 2 mm to 10 mm (e.g., 2 mm, 4 mm, 6 mm, 8 mm or 10 mm). In this way, in a case of satisfying a condition that the first connection portion 30 and the first flexible circuit board 50 are bonded, the first extension portion 15 is made narrow. In the second direction Y, a dimension of the second extension portion 25 is in a range of 2 mm to 10 mm (e.g., 2 mm, 4 mm, 6 mm, 8 mm or 10 mm).

The first extension portion 15 is connected to at least part of the first edge 141. In some examples, referring to FIG. 2, the first extension portion 15 is connected to part of the first edge 141. That is, in the third direction X, a dimension of the first extension portion 15 is less than a dimension of the first edge 141. In some other examples, referring to FIGS. 12 and 13, the first extension portion 15 is connected to all the first edge 141. That is, in the third direction X, a dimension of the first extension portion 15 is equal to a dimension of the first edge 141.

Figure 2:
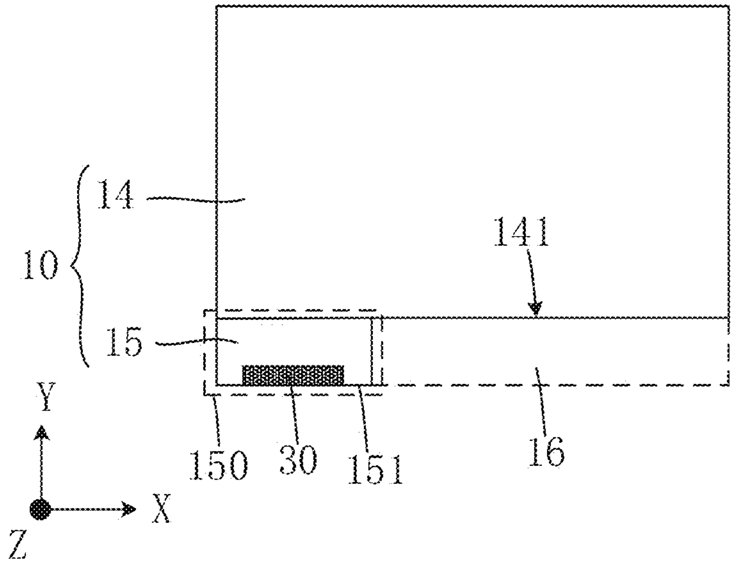
FIG. 2 is a structural diagram of a first substrate, in accordance with some embodiments.
Figure 8:
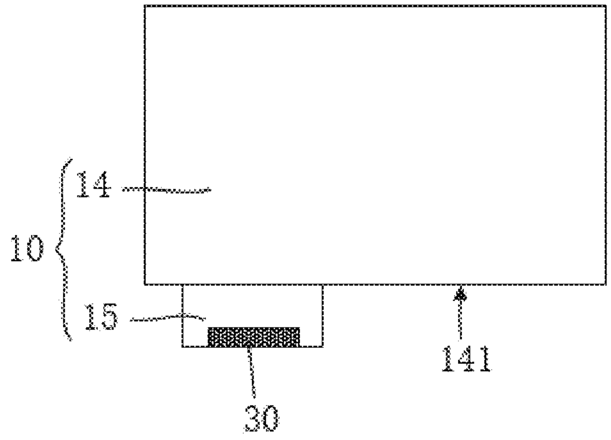
FIGS. 8 to 12 are each a structural diagram of a first substrate, in accordance with some embodiments.
Figure 9:
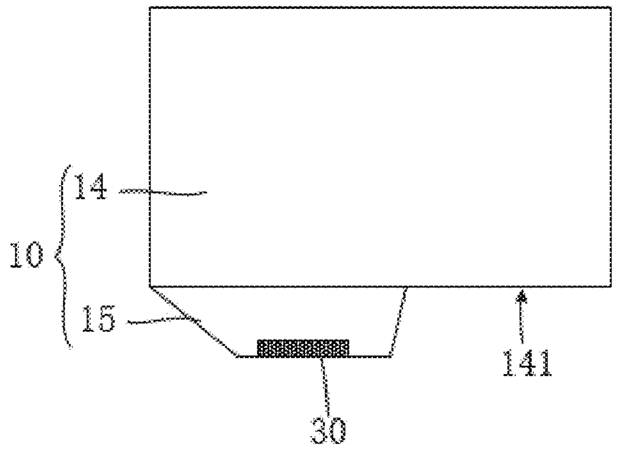
Figure 10:
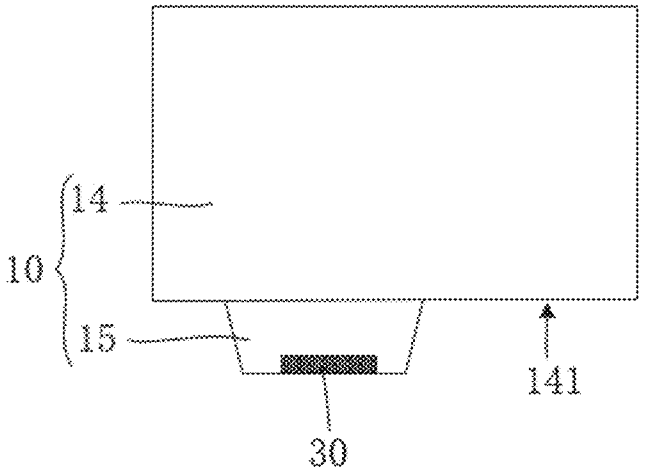
Figure 11:
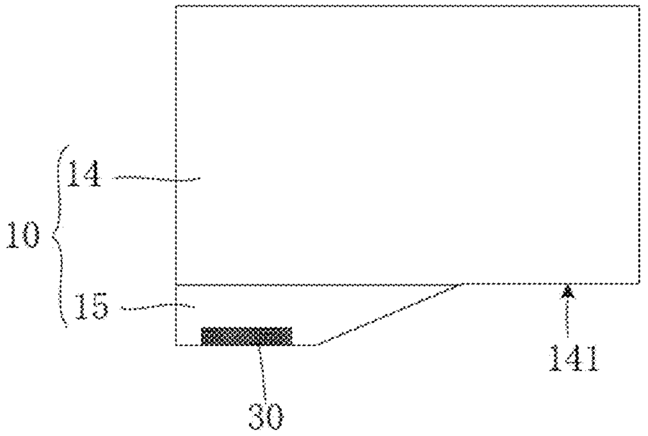
Figure 12:
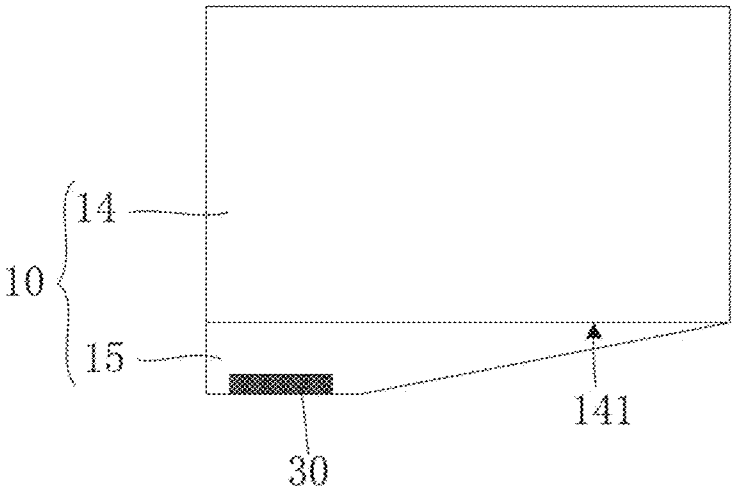

In a possible implementation, the first extension portion 15 may be in a shape of a rectangle shown in FIGS. 2 and 8, or may be in a shape of a trapezoid, a parallelogram, or the like. The trapezoid may be an irregular trapezoid as shown in FIG. 9, an isosceles trapezoid as shown in FIG. 10, or a right-angled trapezoid as shown in FIGS. 11 and 12.

The second extension portion 25 is connected to at least part of the second edge 241. In some examples, referring to FIG. 3, the second extension portion 25 is connected to part of the second edge 241. That is, in the third direction X, a dimension of the second extension portion 25 is less than a dimension of the second edge 241. In some other examples, the second extension portion 25 is connected to all the second edge 241. That is, in the third direction X, a dimension of the second extension portion 25 is equal to a dimension of the second edge 241.

In a possible implementation, the shape of the second extension portion 25 and the shape of the first extension portion 15 may be mirror symmetrical. For example, the first extension portion 15 shown in FIG. 2 is mirror symmetrical to the second extension portion 25 shown in FIG. 3. As another example, the second extension portion 25 is mirror symmetrical to the first extension portion 15 as shown in any of FIGS. 8 to 12.

Figure 3:
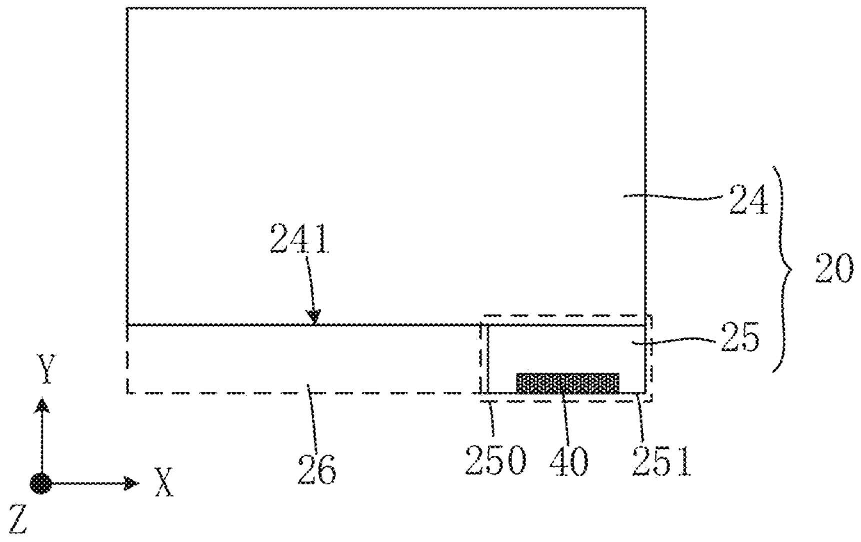
FIG. 3 is a structural diagram of a second substrate, in accordance with some embodiments.
Figure 4:
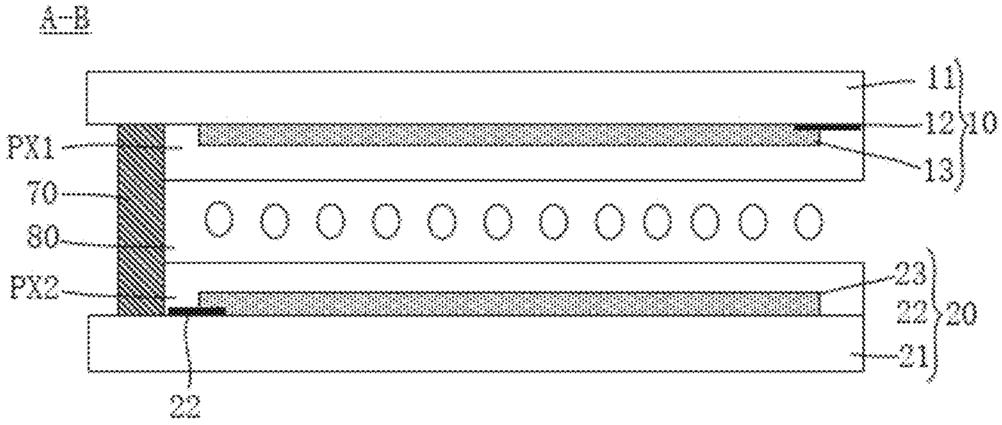
FIG. 4 is a sectional view taken along an A-B line in FIG. 1.

In the first direction Z, at least part of the first extension portion 15 and at least part of the second extension portion 25 are staggered. As shown in FIGS. 2 and 3, the first connection portion 30 is located in a staggered area 150 of the first extension portion 15 (i.e., an area of the first extension portion 15 staggered with the second extension portion 25), and the second connection portion 40 is located in a staggered area 250 of the second extension portion 25 (i.e., an area of the second extension portion 25 staggered with the first extension portion 15. In this way, the overlapping area between the first substrate 10 and the second substrate 20 may increase, and thus the liquid crystal layer 80 provided in the overlapping area may also increase accordingly, thereby improving the utilization rate of the first substrate 10 and the second substrate 20.

In some examples, with continued reference to FIGS. 1 to 4, in the first direction Z, the first extension portion 15 and the second extension portion 25 are completely staggered. That is, the orthographic projection of the first extension portion 15 on the plane where the second substrate 20 is located does not overlap with the second extension portion 25. Then, in the first direction Z, the first connection portion 30 located on the first extending portion 15 does not overlap with the second connection portion 40 located on the second extending portion 25. In some other examples, in the first direction Z, the first extending portion 15 and the second extending portion 25 are partially staggered. That is, the first extending portion 15 has a first staggered area and a second overlapping area, and the second extending portion 25 has a second staggered area and a second overlapping area. In the first direction Z, the first overlapping area overlaps with the second overlapping area, and the first staggered area is staggered with the second staggered area. In this case, the first connection portion 30 is located in the first staggered area of the first extension portion 15, and the second connection portion 40 is located in the second staggered area of the second extension portion 25.

For example, the first extension portion 15 includes a third edge 151. The third edge 151 is opposite to the first edge 141, and the first connection portion 30 is provided proximate to the third edge 151. The second extension portion 25 includes a fourth edge 251. The fourth edge 251 is opposite to the second edge 241, and the second connection portion 40 is provided proximate to the fourth edge 251. As a result, a part of the first flexible circuit board 50 is bonded to the first connection portion 30, and another part of the first flexible circuit board 50 is located outside the first extension portion 15 (i.e., located at the first side edge DC1 of the liquid crystal antenna). Moreover, a part of the second flexible circuit board 60 is bonded to the second connection portion 40, and another part of the second flexible circuit board 60 is located outside the second extension portion 25 (i.e., located at the first side edge DC1 of the liquid crystal antenna).

In this way, referring to FIGS. 1 to 4 and 7, in a case where the first row of liquid crystal antennas DY1 and the second row of liquid crystal antennas DY2 are tiled, if another row of liquid crystal antennas (called a third row of liquid crystal antennas) are further tiled, since the first side edges DC1 of the first row of liquid crystal antennas DY1 and the first side edges DC1 of the second row of liquid crystal antennas DY2 face away from each other, the third row of liquid crystal antennas are tiled with the first side edges DC1 of the first row of liquid crystal antennas DY1 or the first side edges DC1 of the second row of liquid crystal antennas DY2, and another part of the first flexible circuit board 50 and another part of the second flexible circuit board 60 are located at the first side edge DC1. As a result, there is a gap between the third row of liquid crystal antennas and the first side edges DC1 of the first row of liquid crystal antennas DY1 or between the third row of liquid crystal antennas and the first side edges DC1 of the second row of liquid crystal antennas DY2. In order to avoid the occurrence of the gap, in the present examples, a plurality of liquid crystal antennas may be tiled into an antenna array of two rows of liquid crystal antennas in the second direction Y.

Figure 13:
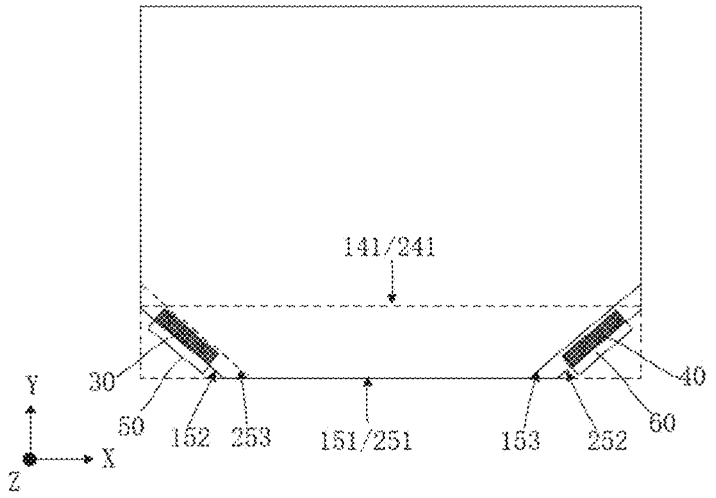
FIG. 13 is a structural diagram of another liquid crystal antenna, in accordance with some embodiments.
Figure 14:
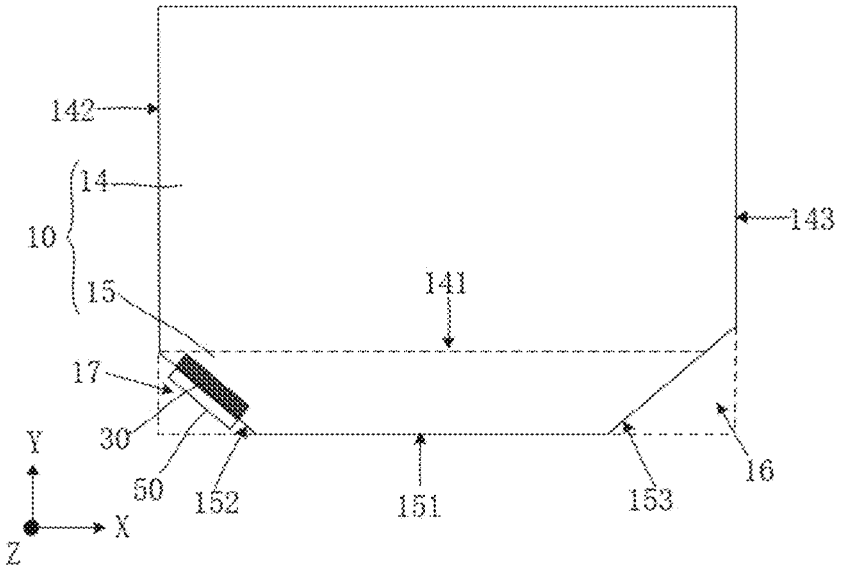
FIG. 14 is a structural diagram of another first substrate, in accordance with some embodiments.
Figure 15:
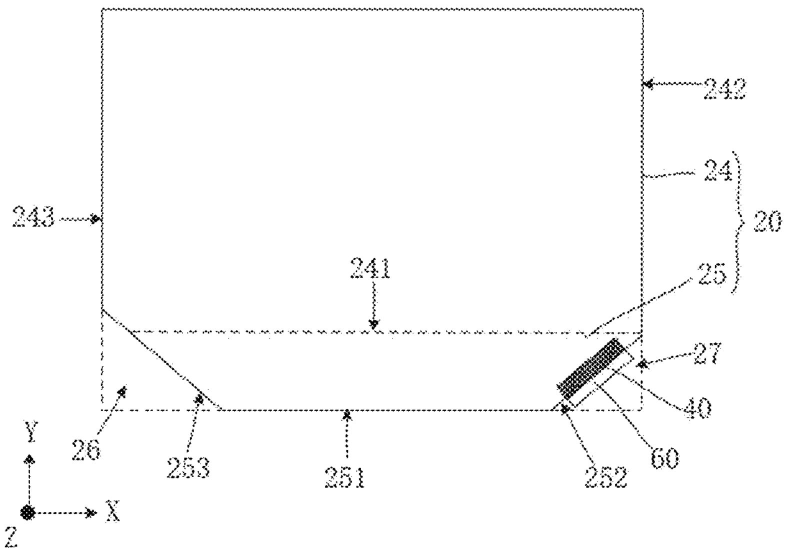
FIG. 15 is a structural diagram of another second substrate, in accordance with some embodiments.

As another example, referring to FIGS. 13 to 15, the first extension portion 15 has a third notch 17, and the second extension portion 25 has a fourth notch 27. In the first direction Z, the third notch 17 and the fourth notch 27 are staggered, that is, an orthographic projection of the third notch 17 on the plane where the second substrate 20 is located does not overlap with the fourth notch 27.

In some examples, the first extension portion 15 further includes a third edge 151, a first corner edge 153 and a second corner edge 152. The third edge 151 is opposite to the first edge 141. The first corner edge 153 at least connects an end of the third edge 151 to the first edge 141. The second corner edge 152 connects another end of the third edge 151 to the first edge 141.

In a possible implementation, the first main body portion 14 further includes a fifth edge 143 and a sixth edge 142 that are opposite. The sixth edge 142 is connected to the first edge 141, and the second corner edge 152 is connected to the sixth edge 142. A virtual extension line of the sixth edge 142, a virtual extension line of the third edge 151 and the second corner edge 152 surround to form the third notch 17 shown in FIG. 14, and the third notch 17 is in a shape of a triangle. For example, the second corner edge 152 may include at least two (e.g., two) second sub-edges. In a case where the second corner edge 152 includes two second sub-edges, the third notch 17 is in a shape of a quadrilateral.

The first corner edge 153 at least connects an end of the third edge 151 to the first edge 141, which can be understood as that the first corner edge 153 is connected to the end of the third edge 151, the first edge 141 and the fifth edge 143. In this case, a virtual extension line of the fifth edge 143, a virtual extension line of the third edge 151 and the first corner edge 153 surround to form the first notch 16 shown in FIG. 14, and the first notch 16 is in a shape of a triangle. For example, the first corner edge 153 may include at least two (e.g., two) first sub-edges. In a case where the first corner edge 153 includes two first sub-edges, the first notch 16 is in a shape of a quadrilateral.

The first corner edge 153 at least connects an end of the third edge 151 to the first edge 141, which can also be understood as that the first corner edge 153 is connected the end of the third edge 151 and the first edge 141, and the first corner edge 153 is not connected to the fifth edge 143. In this case, the fifth edge 143 is connected to the first edge 141. A part of the first edge 141, a virtual extension line of the fifth edge 143, a virtual extension line of the third edge 151 and the first corner edge 153 surround to form the first notch 16, and the first notch 16 is in a shape of a right-angled trapezoid. For example, in a case where the first corner edge 153 includes two first sub-edges, the first notch 16 is in a shape of a pentagon.

In some examples, the second extension portion 25 further includes a fourth edge 251, a third corner edge 253 and a fourth corner edge 252. The fourth edge 251 is opposite to the second edge 241. The third corner edge 253 at least connects an end of the fourth edge 251 to the second edge 241. The fourth corner edge 252 connects another end of the fourth edge 251 to the second edge 241.

In a possible implementation, the second main body portion 24 further includes a seventh edge 243 and an eighth edge 242 that are opposite. The eighth edge 242 is connected to the second edge 241. A virtual extension line of the eighth edge 242, a virtual extension line of the fourth edge 251 and the fourth corner edge 252 surround to form the fourth notch 27 shown in FIG. 15. The fourth notch 27 is in a shape of a triangle. For example, the fourth corner edge 252 may include at least two (e.g., two) fourth sub-edges. In a case where the fourth corner edge 252 includes two fourth sub-edges, the fourth notch 27 is in a shape of a quadrilateral.

The third corner edge 253 at least connects an end of the fourth edge 251 to the second edge 241, which can be understood as that the third corner edge 253 is connected to the end of the fourth edge 251, the second edge 241 and the seventh edge 243. In this case, a virtual extension line of the seventh edge 243, a virtual extension line of the fourth edge 251 and the third corner edge 253 surround to form the second notch 26 shown in FIG. 15, and the second notch 26 is in a shape of a triangle. For example, the third corner edge 253 includes at least two (e.g., two) third sub-edges. In a case where the third corner edge 253 includes two third sub-edges, the second notch 26 is in a shape of a quadrilateral.

The third corner edge 253 at least connects an end of the fourth edge 251 to the second edge 241, which can also be understood as that the third corner edge 253 is connected to the end of the fourth edge 251 and the second edge 241, and the third corner edge 253 is not connected to the seventh edge 243. In this case, the second edge 241 is connected to the seventh edge 243. A part of the second edge 241, a virtual extension line of the seventh edge 243, a virtual extension line of the fourth edge 251 and the third corner edge 253 surround to form the second notch 26, and the second notch 26 is in a shape of a right-angled trapezoid. For example, in a case where the third corner edge 253 includes two third sub-edges, the second notch 26 is in a shape of a pentagon.

The first connection portion 30 is closer to the third notch 17 than to the first notch 16. For example, the first connection portion 30 is closer to the second corner edge 152 than to the first corner edge 153. The second connection portion 40 is closer to the fourth notch 27 than to the second notch 26. For example, the second connection portion 40 is closer to the fourth corner edge 252 than to the third corner edge 253. In this case, a part of the first flexible circuit board 50 is bonded to the first connection portion 30, and another part of the first flexible circuit board 50 is located in the third notch 17; a part of the second flexible circuit board 60 is bonded to the second connection portion 40, and another part of the second flexible circuit board 60 is located in the fourth notch 27.

In some examples, in the first direction Z, the second notch 26 covers the third notch 17, that is, an orthographic projection of the second notch 26 on the first substrate 10 covers the third notch 17. The first notch 16 covers the fourth notch 27, that is, an orthographic projection of the first notch 16 on the plane where the second substrate 20 is located covers the fourth notch 27.

Referring to FIG. 13, in an extending direction of the first edge 141 (i.e., the third direction X), the second corner edge 152, the third corner edge 253, the first corner edge 153, and the fourth corner edge 252 are arranged in sequence. In this way, the first notch 16 at the first corner edge 153 exposes the fourth notch 27 at the fourth corner edge 252, and the second notch 26 at the third corner edge 253 exposes the third notch 17 at the second corner edge 152.

In this way, referring to FIGS. 13 to 16, in a case where the first row of liquid crystal antennas DY1 and the second row of liquid crystal antennas DY2 are tiled, if another row of liquid crystal antennas (called a third row of liquid crystal antennas DY3) are further tiled, the third row of liquid crystal antennas DY3 are tiled with the first side edges of the first row of liquid crystal antennas DY1 or the first side edges of the second row of liquid crystal antennas DY2, and the part of the first flexible circuit board 50 is located in the third notch 17 and the part of the second flexible circuit board 60 is located in the fourth notch 27. Thus, there is no gap between the third row of liquid crystal antennas DY3 and the first side edges of the first row of liquid crystal antennas DY1 or between the third row of liquid crystal antennas DY3 and the first side edges of the second row of liquid crystal antennas DY2. Furthermore, in the present examples, a plurality of liquid crystal antennas may form an antenna array of a plurality of rows of liquid crystal antennas in the second direction Y.

Figure 16:
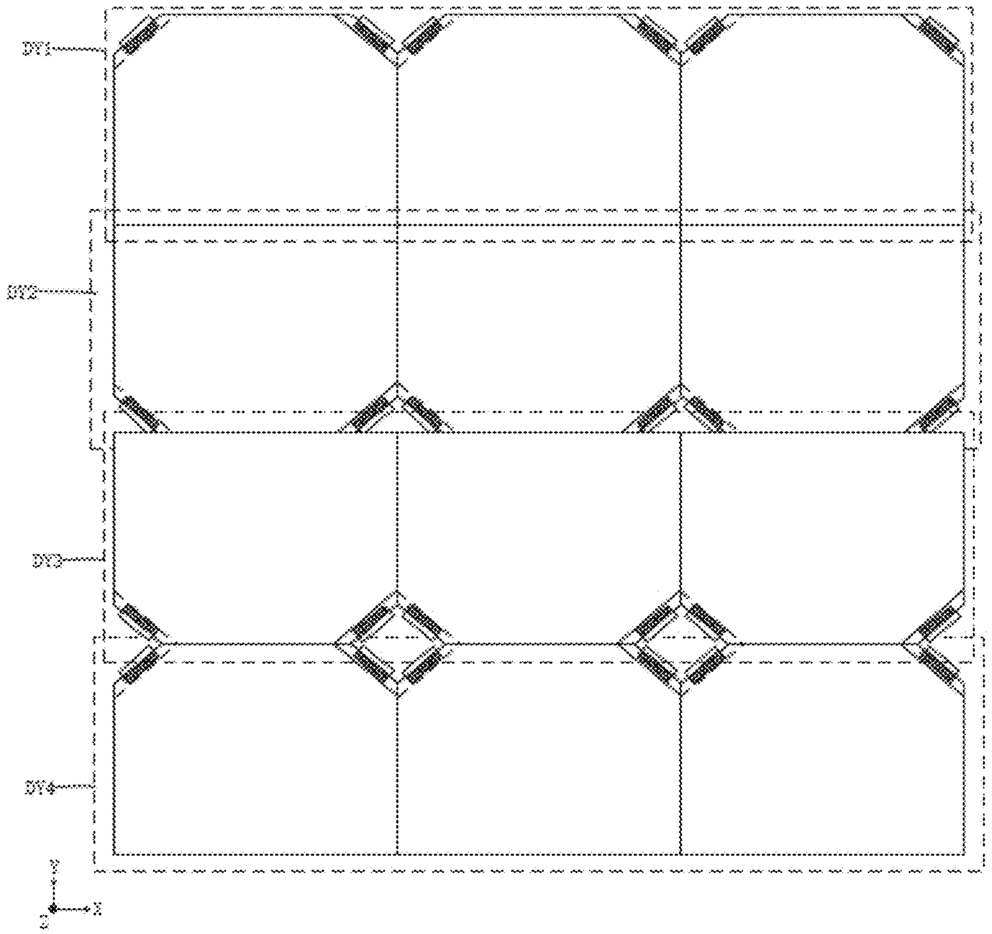
FIG. 16 is a structural diagram of an antenna array formed by a plurality of liquid crystal antennas in FIG. 13.

In the antenna array shown in FIG. 16, second side edges of the third row of liquid crystal antennas DY3 are tiled with the first side edges of the second row of liquid crystal antennas DY2, and first side edges of the third row of liquid crystal antennas DY3 are tiled with first side edges of the fourth row of liquid crystal antennas DY4. For understanding of the first side edges of the third row of liquid crystal antennas DY3 and the second side edges of the third row of liquid crystal antennas DY3, reference may be made to relevant explanation of the first side edges DC1 of the first row of liquid crystal antennas DY1 and the second side edges DC2 of the first row of liquid crystal antennas DY1. For understanding of the first side edges of the fourth row of liquid crystal antennas DY4 and the second side edges of the fourth row of liquid crystal antennas DY4, reference may be made to relevant explanation of the first side edges DC1 of the first row of liquid crystal antennas DY1 and the second side edges DC2 of the first row of liquid crystal antennas DY1.

In some examples, in the first direction Z, the third edge 151 overlaps with the fourth edge 251. That is, the extending direction of the third edge 151 is parallel to the extending direction of the fourth edge 251, and a dimension of the orthographic projection of the third edge 151 on the plane where the second substrate 20 is located is equal to a dimension of the fourth edge 251. In this way, in the second direction Y, there is no gap between adjacent first substrates 10 of a plurality of rows of liquid crystal antennas, and there is no gap between adjacent second substrates 20 of the plurality of rows of liquid crystal antennas.

In some examples, an included angle between the second corner edge 152 and the first edge 141 is less than or equal to 20°. For example, the included angle between the second corner edge 152 and the first edge 141 is equal to 20°. As another example, the included angle between the second corner edge 152 and the first edge 141 is less than 20°. In some examples, an included angle between the fourth corner edge 252 and the second edge 241 is less than or equal to 20°. For example, the included angle between the fourth corner edge 252 and the second edge 241 is equal to 20°. As another example, the included angle between the fourth corner edge 252 and the second edge 241 is less than 20°. In this way, the first notch 16, the second notch 26, the third notch 17 and the fourth notch 27 have small areas, thereby increasing the overlapping area between the first substrate 10 and the second substrate 20.

Example 2

In Example 1, since the second connection portion 40 is located on the second substrate 20, the second connection portion 40 may be directly connected to the second control lines 22. However, in Example 2, the second connection portion 40 is located on the first substrate 10, and thus the second control lines 22 need to be indirectly connected to the second connection portion 40 on the first substrate 10. Then in Example 2, referring to FIGS. 17, 18 and 19, the first substrate 10 further includes a plurality of third control lines 18, and the liquid crystal antenna further includes a plurality of transfer portions 90 located between the first substrate 10 and the second substrate 20. The plurality of second control lines 22 are connected to the plurality of third control lines 18 in one-to-one correspondence by the plurality of transfer portions 90, and the second connection portion 40 is electrically connected to the plurality of second control lines 22 by the plurality of third control lines 18 and the transfer portions 90. Thus, the second connection portion 40 and the plurality of second control lines 22 are connected by the plurality of third control lines 18 and the plurality of transfer portions 90, so that the first connection portion 30 and the second connection portion 40 are both located on the first substrate 10.

Figure 17:
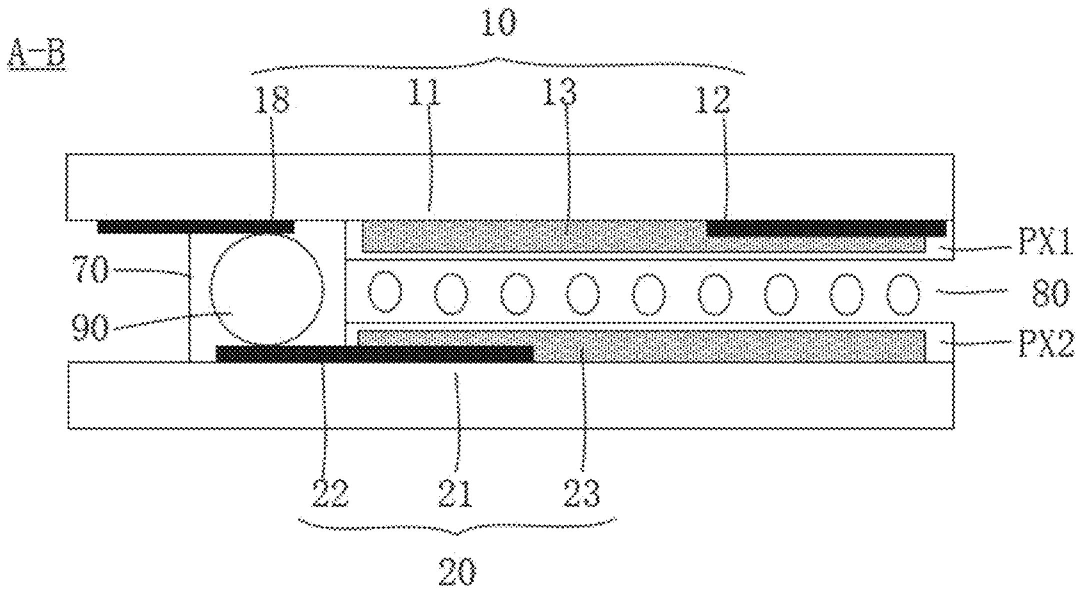
FIG. 17 is another sectional view taken along an A-B line in FIG. 1.

In some examples, the shape of the transfer portion 90 may be a regular shape, such as a sphere shown in FIG. 17, an ellipse, or a polygon. The material of the transfer portion 90 is a conductive material. The conductive material may be a metal material. The metal material may be a metal element such as copper, iron, aluminum or silver, or may be an alloy of some or all of the above metal elements. The conductive material may alternatively be a non-metallic material such as graphite or silicon (e.g., doped silicon). For example, a plurality of transfer portions 90 may be disposed in the frame sealant 70, and adjacent transfer portions 90 are insulated from each other.

Figure 18:
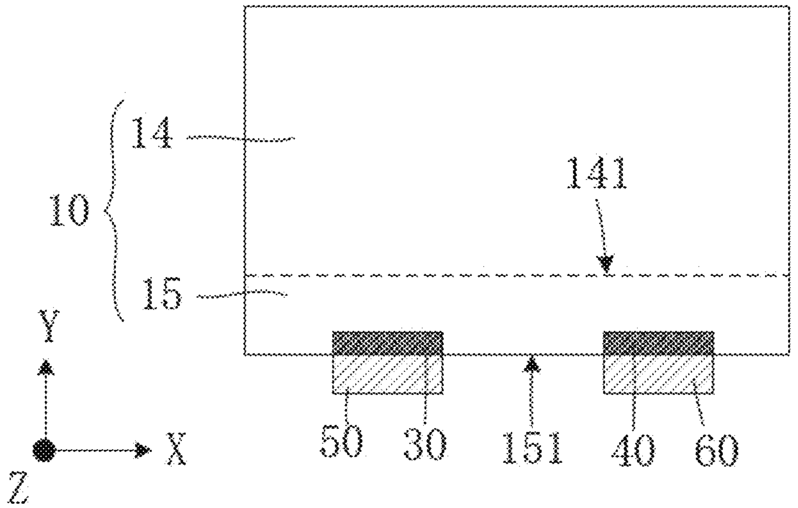
FIG. 18 is a structural diagram of yet another first substrate, in accordance with some embodiments.
Figure 19:
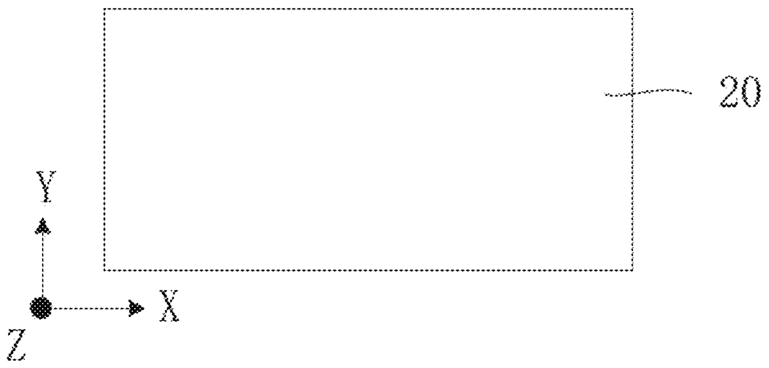
FIG. 19 is a structural diagram of yet another second substrate, in accordance with some embodiments.

In some examples, referring to FIG. 18, the first connection portion 30 and the second connection portion 40 may be provided separately. As another example, referring to FIG. 20, the first connection portion 30 and the second connection portion 40 may be provided integrally.

For example, the first substrate 10 has a first main body portion 14 and a first extension portion 15. For example, the first substrate 10 may have a first notch, and reference may be made to the relevant description of the shape of the first substrate 10 in Example 1. As another example, the first substrate 10 may have no notch as shown in FIG. 18. The first main body portion 14 has a first edge 141, and the first extension portion 15 is connected to at least part of the first edge 141. For description of the connection between the first extension portion 15 and at least part of the first edge 141, reference may be made to the relevant description in Example 1 of the connection between the first extension portion 15 and at least part of the first edge 141.

The first connection portion 30 and the second connection portion 40 are located on the first extension portion 15. In some examples, both the first connection portion 30 and the second connection portion 40 are provided proximate to the third edge 151. In this way, a part of the first flexible circuit board 50 is bonded to the first connection portion 30, and another part of the first flexible circuit board 50 is located outside the first extension portion 15 (i.e., located at the first side edge DC1 of the liquid crystal antenna). Moreover, a part of the second flexible circuit board 60 is bonded to the second connection portion 40, and another part of the second flexible circuit board 60 is located outside the first extension portion 15 (i.e., located at the first side edge DC1 of the liquid crystal antenna).

In this way, in a case where the first row of liquid crystal antennas and the second row of liquid crystal antennas are tiled, if another row of liquid crystal antennas (called the third row of liquid crystal antennas) are further tiled, since the first side edges of the first row of liquid crystal antennas and the first side edges of the second row of liquid crystal antennas face away from each other, the third row of liquid crystal antennas are tiled with the first side edges of the first row of liquid crystal antennas or the first side edges of the second row of liquid crystal antennas, and a part of the first flexible circuit board and a part of the second flexible circuit board are located at the first side edge. As a result, there is a gap between the third row of liquid crystal antennas and the first side edges of the first row of liquid crystal antennas or between the third row of liquid crystal antennas and the first side edges of the second row of liquid crystal antennas. In order to avoid the occurrence of the gap, in the present examples, a plurality of liquid crystal antennas form an antenna array of two rows of liquid crystal antennas in the second direction Y.

In the first direction Z, the second substrate 20 overlaps with the first main body portion 14. In this way, an overlapping area of the first substrate 10 and the second substrate 20 is an overlapping area of the first main body portion 14 and the second substrate 20.

Figure 20:
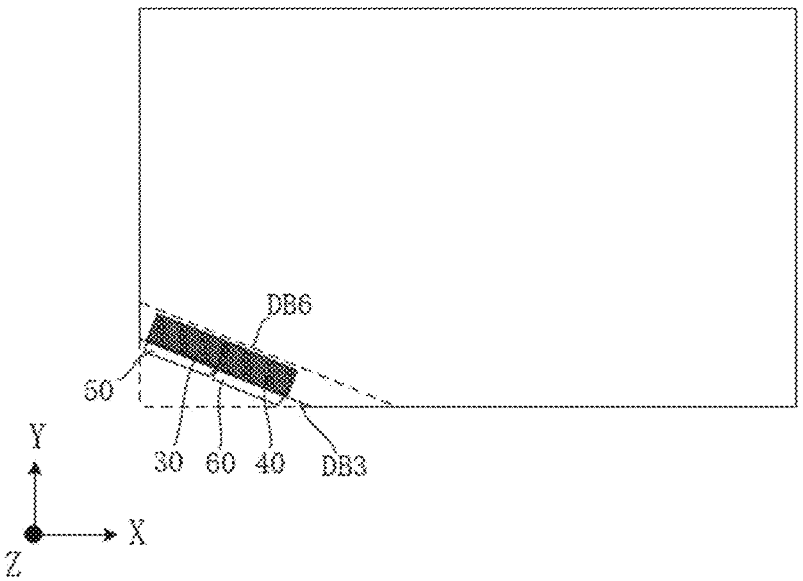
FIG. 20 is a structural diagram of yet another liquid crystal antenna, in accordance with some embodiments.
Figure 21:
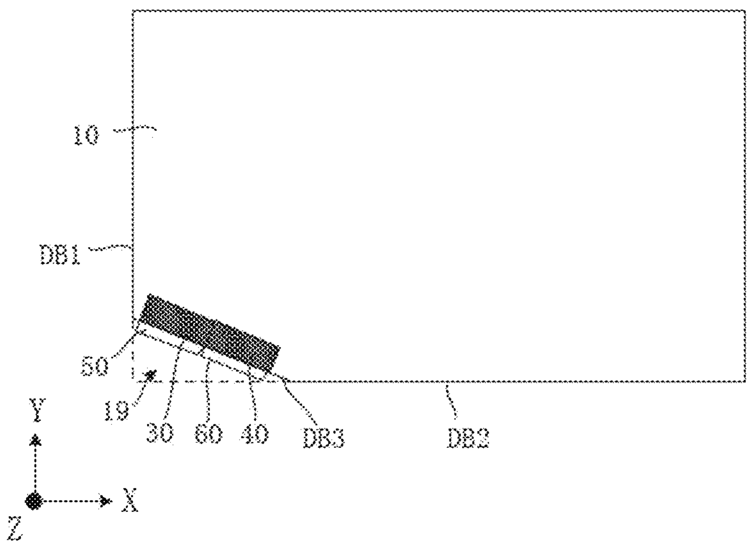
FIG. 21 is a structural diagram of yet another first substrate, in accordance with some embodiments.
Figure 22:
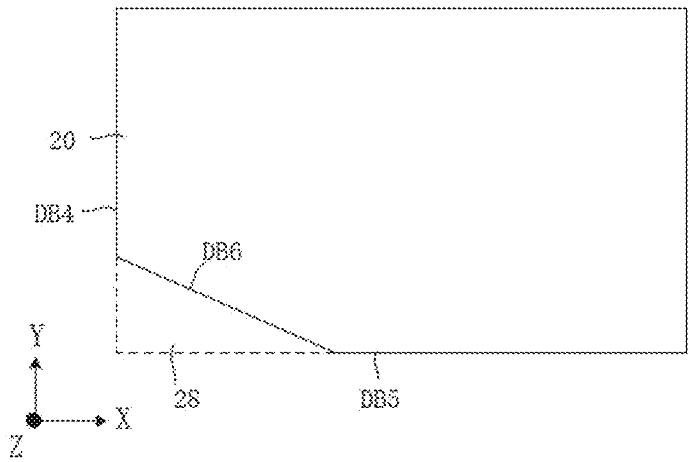
FIG. 22 is a structural diagram of yet another second substrate, in accordance with some embodiments.

As another example, referring to FIGS. 20 to 22, the first substrate 10 includes a first connection edge DB1, a second connection edge DB2 and a fifth corner edge DB3. The fifth corner edge DB3 connects the first connection edge DB1 to the second connection edge DB2. A virtual extension line of the first connection edge DB1, a virtual extension line of the second connection edge DB2 and the fifth corner edge DB3 surround to form a fifth notch 19.

The second substrate 20 includes a third connection edge DB4, a fourth connection edge DB5 and a sixth corner edge DB6. The sixth corner edge DB6 connects the third connection edge DB4 to the fourth connection edge DB5. A virtual extension line of the third connection edge DB4, a virtual extension line of the fourth connection edge DB5 and the sixth corner edge DB6 surround to form a sixth notch 28.

The first connection portion 30 and the second connection portion 40 are provided proximate to the fifth corner edge DB3. Thus, a part of the first flexible circuit board 50 is bonded to the first connection portion 30, and another part of the first flexible circuit board 50 is located in the fifth notch 19; a part of the second flexible circuit board 60 is bonded to the second connection portion 40, and another part of the second flexible circuit board 60 is located in the fifth notch 19. The sixth notch 28 exposes the first connection portion 30 and the second connection portion 40. Thus, through the sixth notch 28, the first control lines 12 may be electrically connected to the first connection portion 30, and the third control lines 18 may be electrically connected to the second connection portion 40.

In this way, referring to FIGS. 20 to 24, in a case where the first row of liquid crystal antennas DY1 and the second row of liquid crystal antennas DY2 are tiled, if another row of liquid crystal antennas (called the third row of liquid crystal antennas DY3) are further tiled, the third row of liquid crystal antennas DY3 are tiled with the first side edges of the first row of liquid crystal antennas DY1 or the first side edges of the second row of liquid crystal antennas DY2, and another part of the first flexible circuit board 50 and another part of the second flexible circuit board 60 are located in the fifth notch 19. Thus, there is no gap between the third row of liquid crystal antennas DY3 and the first side edges of the first row of liquid crystal antennas DY1 or between the third row of liquid crystal antennas DY3 and the first side edges of the second row of liquid crystal antennas DY2. Furthermore, in the present examples, a plurality of liquid crystal antennas may form an antenna array of a plurality of rows of liquid crystal antennas in the second direction Y.

Figure 23:
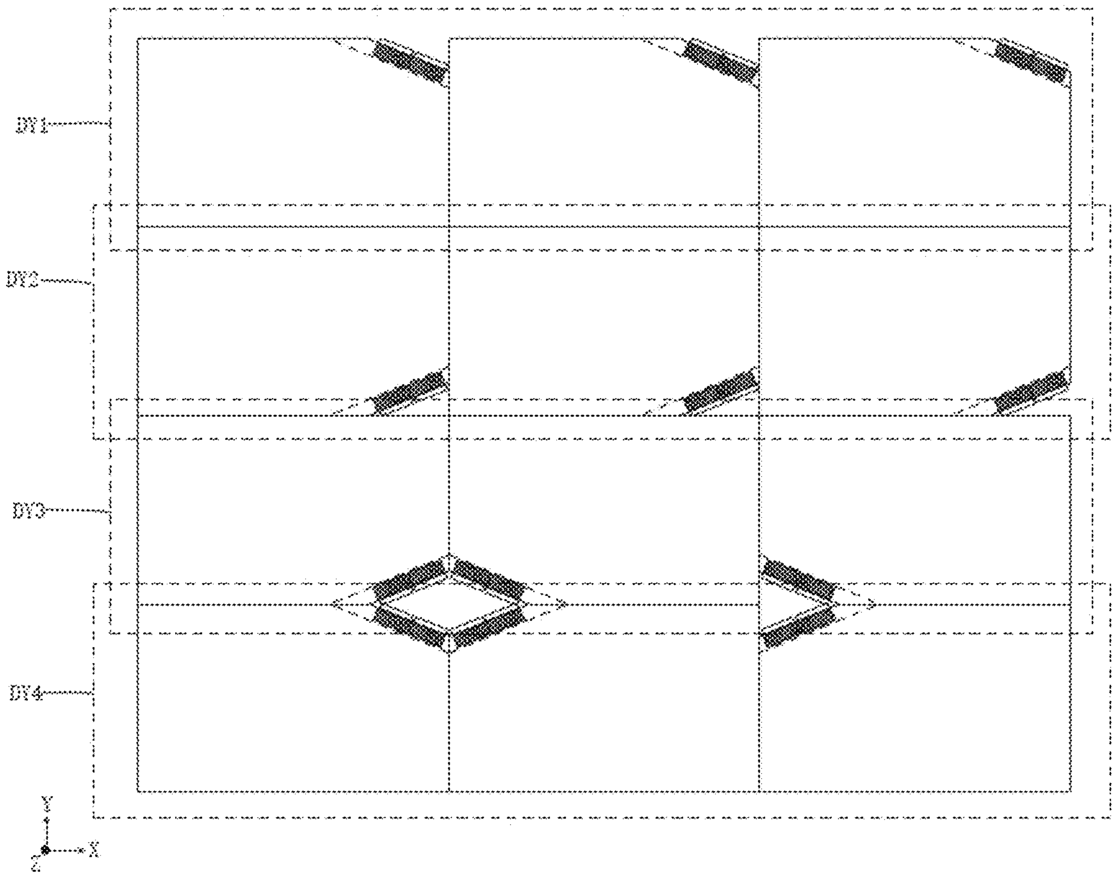
FIGS. 23 and 24 are each a structural diagram of an antenna array formed by a plurality of liquid crystal antennas in FIG. 20.
Figure 24:
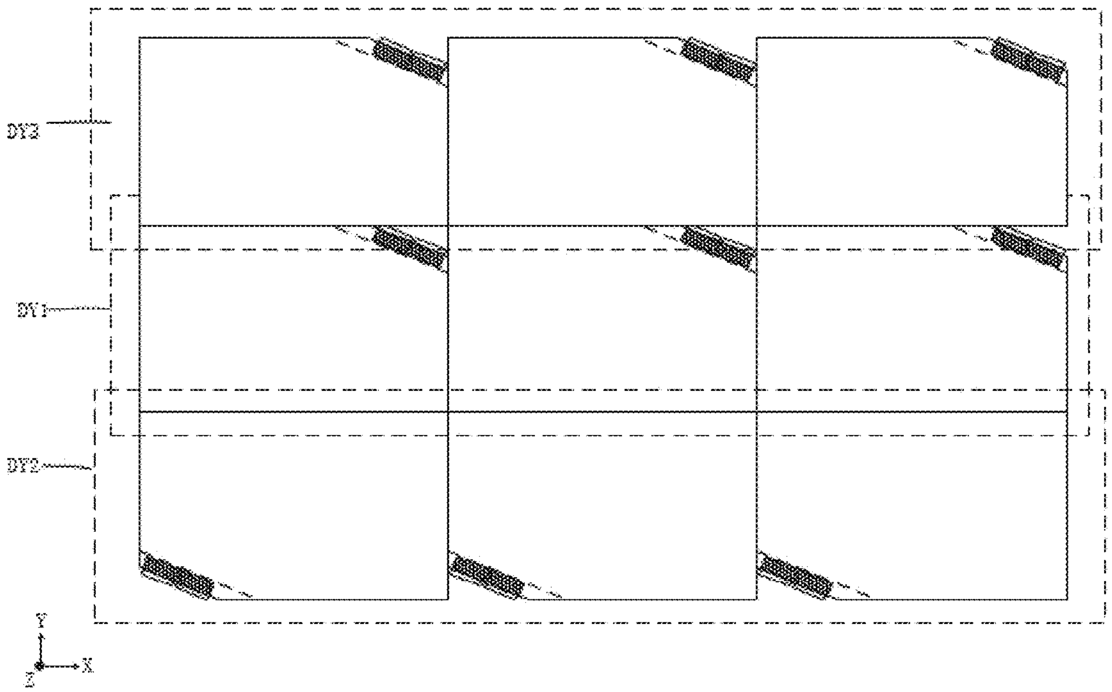

In the antenna array shown in FIG. 23, the second side edges of the third row of liquid crystal antennas DY3 may be tiled with the first side edges of the second row of liquid crystal antennas DY2, and the first side edges of the third row of liquid crystal antennas DY3 are tiled to the first side edges of the fourth row of liquid crystal antennas DY4. In the antenna array shown in FIG. 24, the second side edges of the third row of liquid crystal antennas DY3 may be tiled with the first side edges of the first row of liquid crystal antennas DY1.

Figure 25:
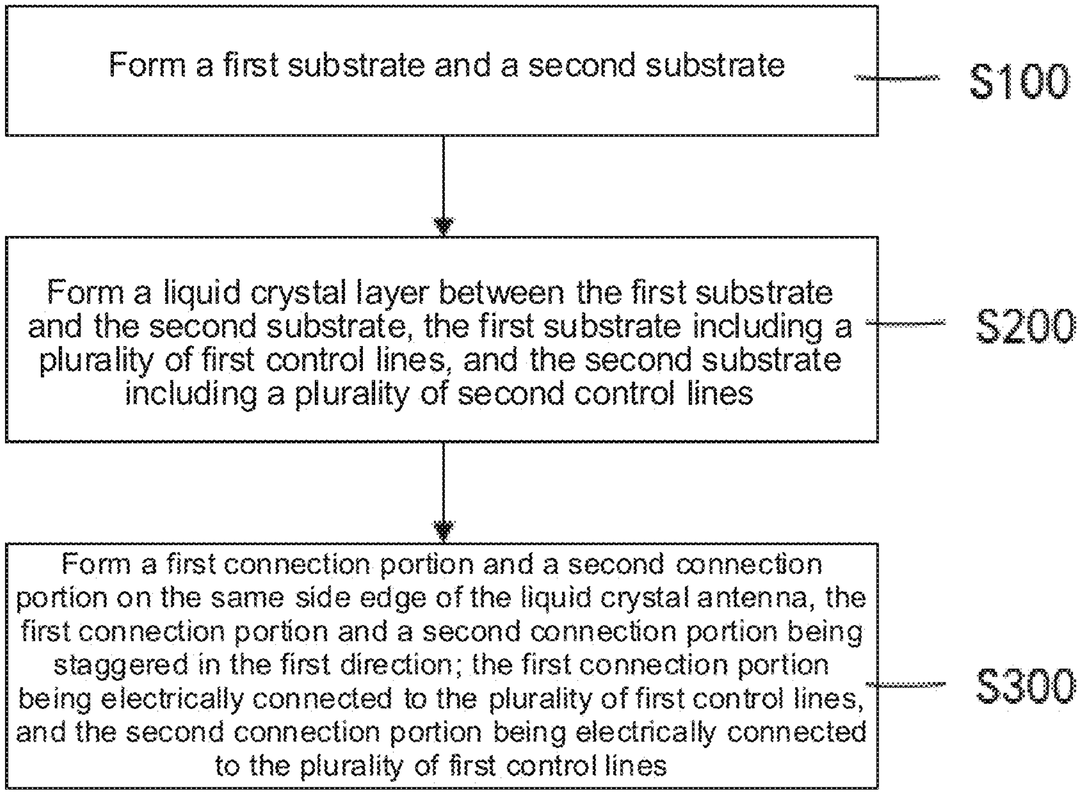
FIG. 25 is a flowchart of a method for manufacturing a liquid crystal antenna, in accordance with some embodiments.

Embodiments of the present disclosure further provide a method for manufacturing a liquid crystal antenna. Referring to FIG. 25, the method includes steps S100 to S300.

In step S100, a first substrate and a second substrate are formed.

In step S200, a liquid crystal layer is formed between the first substrate and the second substrate. The first substrate includes a plurality of first control lines, and the second substrate includes a plurality of second control lines.

In step S300, a first connection portion and a second connection portion are formed on the same side edge of the liquid crystal antenna, and the first connection portion and a second connection portion are staggered in the first direction. The first connection portion is electrically connected to the plurality of first control lines, and the second connection portion is electrically connected to the plurality of first control lines. For the relevant description of steps S100 to S300, reference may be made to the relevant description of the liquid crystal antenna mentioned above.

For example, the first connection portion is located on the first substrate, and a second notch is cut in the second substrate to expose the first connection portion. The second connection portion is located on the second substrate, and a first notch is cut in the first substrate to expose the second connection portion.

In some examples, the first substrate has a first main body portion and a first initial extension portion. The first main body portion has a first edge. The first initial extended portion of the first substrate is cut to obtain a first extended portion, and the first extension portion is connected to at least part of the first edge. The second substrate has a second main body portion and a second initial extension portion. The second main body portion has a second edge. The second initial extension portion of the second substrate is cut to obtain a second extension portion, and the second extension portion is connected to at least part of the second edge.

As another example, a fifth notch is cut in the first substrate. The first substrate includes a first connection edge, a second connection edge and a fifth corner edge, and the fifth corner edge connects the first connection edge to the second connection edge. A virtual extension line of the first connection edge, a virtual extension line of the second connection edge and the fifth corner edge surround to form the fifth notch.

A sixth notch is cut in the second substrate. The second substrate includes a third connection edge, a fourth connection edge and a sixth corner edge, and the sixth corner edge connects the third connection edge to the fourth connection edge. A virtual extension line of the third connection edge, a virtual extension line of the fourth connection edge and the sixth corner edge surround to form the sixth notch.

The first connection portion and the second connection portion are provided proximate to the fifth corner edge, and the sixth notch exposes the first connection portion and the second connection portion.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A liquid crystal antenna, comprising:

a liquid crystal layer;

a first substrate and a second substrate located on two sides of the liquid crystal layer in a first direction; the first substrate including a plurality of first control lines, and the second substrate including a plurality of second control lines; and a first connection portion and a second connection portion located on a same side edge of the liquid crystal antenna and staggered in the first direction; the first connection portion being electrically connected to the plurality of first control lines, and the second connection portion being electrically connected to the plurality of second control lines; wherein the first connection portion is located on the first substrate; the second substrate has a second notch exposing the first connection portion; and the second connection portion is located on the second substrate; the first substrate has a first notch exposing the second connection portion.

2. The liquid crystal antenna according to claim 1, wherein the first substrate includes a first main body portion and a first extension portion; the first main body portion has a first edge, and the first extension portion is connected to at least part of the first edge; and the second substrate includes a second main body portion and a second extension portion; the second main body portion has a second edge, and the second extension portion is connected to at least part of the second edge; wherein in the first direction, the first edge overlaps with the second edge, and at least part of the first extension portion and at least part of the second extension portion are staggered; the first connection portion is located in a staggered area of the first extension portion, and the second connection portion is located in a staggered area of the second extension portion.

3. The liquid crystal antenna according to claim 2, wherein the first extension portion has a third notch, and the first connection portion is disposed proximate to the third notch; and the second extension portion has a fourth notch, and the second connection portion is disposed proximate to the fourth notch; wherein in the first direction, the third notch and the fourth notch are staggered.

4. The liquid crystal antenna according to claim 3, wherein the first extension portion includes a third edge, a first corner edge and a second corner edge; the third edge is opposite to the first edge, the first corner edge at least connects an end of the third edge to the first edge, and the second corner edge connects another end of the third edge to the first edge; the first connection portion is disposed proximate to the second corner edge; and the second extension portion includes a fourth edge, a third corner edge and a fourth corner edge; the fourth edge is opposite to the second edge, the third corner edge at least connects an end of the fourth edge to the second edge, and the fourth corner edge connects another end of the fourth edge to the second edge; the second connection portion is disposed proximate to the fourth corner edge; wherein in an extending direction of the first edge, the second corner edge, the third corner edge, the first corner edge, and the fourth corner edge are arranged in sequence.

5. The liquid crystal antenna according to claim 4, wherein an included angle between the second corner edge and the first edge is less than or equal to 20°; and an included angle between the fourth corner edge and the second edge is less than or equal to 20°.

6. The liquid crystal antenna according to claim 4, wherein in the first direction, the third edge overlaps with the fourth edge.

7. The liquid crystal antenna according to claim 1, wherein the first connection portion and the second connection portion are both located on the first substrate;

the first substrate further includes a plurality of third control lines; the liquid crystal antenna further comprises a plurality of transfer portions located between the first substrate and the second substrate; the plurality of second control lines are connected to the plurality of third control lines in one-to-one correspondence by the plurality of transfer portions; and the second connection portion is electrically connected to the plurality of second control lines by the plurality of third control lines and the transfer portions.

8. The liquid crystal antenna according to claim 1, further comprising:

a first flexible circuit board bonded to the first connection portion; and a second flexible circuit board bonded to the second connection portion.

9. The liquid crystal antenna according to claim 1, wherein the first substrate further includes a first electrode plate, and the plurality of first control lines are electrically connected to the first electrode plate; and the second substrate further includes a second electrode plate, and the plurality of second control lines are electrically connected to the second electrode plate.

10. An antenna array, comprising a plurality of liquid crystal antennas tiled together and each according to claim 1.

11. The antenna array according to claim 10, wherein the plurality of liquid crystal antennas are arranged into at least two rows of liquid crystal antennas in a second direction, and the second direction intersects the first direction.

12. The antenna array according to claim 11, wherein in two adjacent rows of liquid crystal antennas, side edges of a row of liquid crystal antennas not provided with the first connection portion and the second connection portion are adjacent to side edges of another row of liquid crystal antennas not provided with the first connection portion and the second connection portion in the second direction.

13. The antenna array according to claim 10, wherein the first connection portion is located on the first substrate; the first substrate has a first notch exposing the second connection portion, and includes a first main body portion and a first extension portion; the first extension portion has a third notch, and the first connection portion is disposed proximate to the third notch;

the second connection portion is located on the second substrate; the second substrate has a second notch exposing the first connection portion, and includes a second main body portion and a second extension portion; the second extension portion has a fourth notch, and the second connection portion is disposed proximate to the fourth notch; and the plurality of liquid crystal antennas are arranged into at least three rows of liquid crystal antennas in a second direction, and the second direction intersects the first direction.

14. The antenna array according to claim 10, wherein the first connection portion and the second connection portion are both located on the first substrate; the first substrate further includes a plurality of third control lines; the liquid crystal antenna further comprises a plurality of transfer portions located between the first substrate and the second substrate; the plurality of second control lines are connected to the plurality of third control lines in one-to-one correspondence by the plurality of transfer portions; and the second connection portion is electrically connected to the plurality of second control lines by the plurality of third control lines and the transfer portions;

the first substrate includes a first connection edge, a second connection edge and a fifth corner edge, and the fifth corner edge connects the first connection edge to the second connection edge; a virtual extension line of the first connection edge, a virtual extension line of the second connection edge and the fifth corner edge surround a fifth notch;

the second substrate includes a third connection edge, a fourth connection edge and a sixth corner edge, and the sixth corner edge connects the third connection edge to the fourth connection edge; a virtual extension line of the third connection edge, a virtual extension line of the fourth connection edge and the sixth corner edge surround a sixth notch;

the first connection portion and the second connection portion are disposed proximate to the fifth corner edge, and the sixth notch exposes the first connection portion and the second connection portion; and the plurality of liquid crystal antennas are arranged into at least three rows of liquid crystal antennas in a second direction, and the second direction intersects the first direction.

15. A method for manufacturing a liquid crystal antenna, comprising:

forming a first substrate and a second substrate;

forming a liquid crystal layer between the first substrate and the second substrate; the first substrate including a plurality of first control lines, and the second substrate including a plurality of second control lines; and forming a first connection portion and a second connection portion on a same side edge of the liquid crystal antenna, the first connection portion and the second connection portion being staggered in a first direction; the first connection portion being electrically connected to the plurality of first control lines, and the second connection portion being electrically connected to the plurality of second control lines; wherein the first connection portion is located on the first substrate; the second substrate has a second notch exposing the first connection portion; and the second connection portion is located on the second substrate; the first substrate has a first notch exposing the second connection portion.

16. A liquid crystal antenna, comprising:

a liquid crystal layer;

a first substrate and a second substrate located on two sides of the liquid crystal layer in a first direction; the first substrate including a plurality of first control lines, and the second substrate including a plurality of second control lines; and a first connection portion and a second connection portion located on a same side edge of the liquid crystal antenna and staggered in the first direction; the first connection portion being electrically connected to the plurality of first control lines, and the second connection portion being electrically connected to the plurality of second control lines; wherein the first connection portion and the second connection portion are both located on the first substrate;

the first substrate further includes a plurality of third control lines; the liquid crystal antenna further comprises a plurality of transfer portions located between the first substrate and the second substrate; the plurality of second control lines are connected to the plurality of third control lines in one-to-one correspondence by the plurality of transfer portions; and the second connection portion is electrically connected to the plurality of second control lines by the plurality of third control lines and the transfer portions.

17. The liquid crystal antenna according to claim 16, wherein the first substrate includes a first main body portion and a first extension portion; the first main body portion has a first edge, and the first extension portion is connected to at least part of the first edge; the first connection portion and the second connection portion are located on the first extension portion; and in the first direction, the second substrate overlaps with the first main body portion.

18. The liquid crystal antenna according to claim 16, wherein the first substrate includes a first connection edge, a second connection edge and a fifth corner edge, and the fifth corner edge connects the first connection edge to the second connection edge; a virtual extension line of the first connection edge, a virtual extension line of the second connection edge and the fifth corner edge surround a fifth notch; and the second substrate includes a third connection edge, a fourth connection edge and a sixth corner edge, and the sixth corner edge connects the third connection edge to the fourth connection edge; a virtual extension line of the third connection edge, a virtual extension line of the fourth connection edge and the sixth corner edge surround a sixth notch; wherein the first connection portion and the second connection portion are disposed proximate to the fifth corner edge, and the sixth notch exposes the first connection portion and the second connection portion.

19. The liquid crystal antenna according to claim 16, wherein the second connection portion and the first connection portion are disposed integrally.

20. The liquid crystal antenna according to claim 19, further comprising:

a frame sealant bonding the first substrate to the second substrate, wherein the plurality of transfer portions are disposed in the frame sealant.

* * * * *